UNITED STATES PATENT OFFICE.

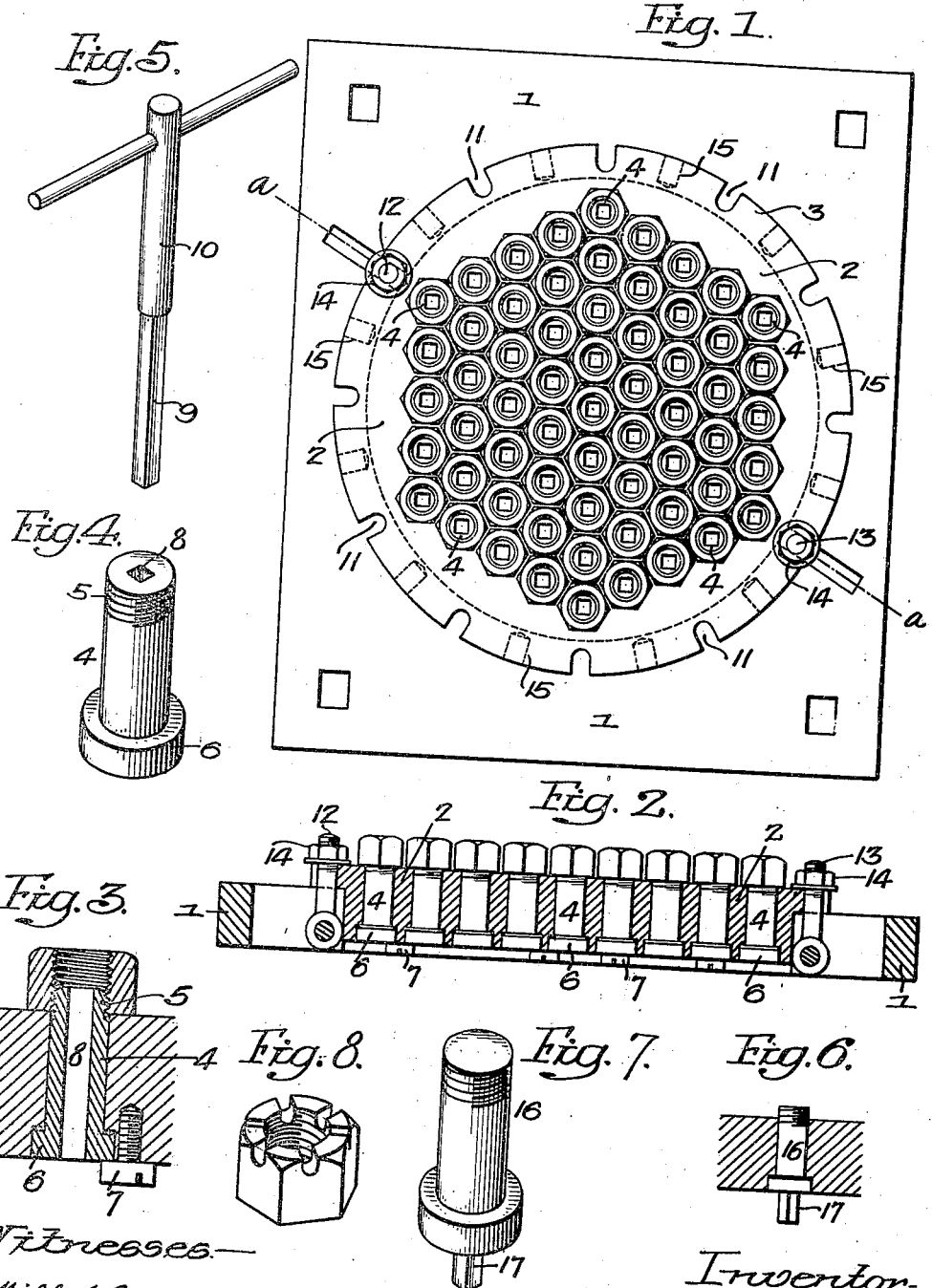
W. T. LINGO.
CHUCK FOR HOLDING NUTS.
APPLICATION FILED JULY 14, 1913.
1,087,024.
Patented Feb. 10, 1914.

WILLIAM T. LINGO, OF PHILADELPHIA, PENNSYLVANIA.

CHUCK FOR HOLDING NUTS.

1,087,024.

Specification of Letters Patent. Patented Feb. 10, 1914.

Application filed July 14, 1913. Serial No. 778,667.

*To all whom it may concern:*

Be it known that I, WILLIAM T. LINGO, a citizen of the United States, residing in Philadelphia, Pennsylvania, have invented certain Improvements in Chucks for Holding Nuts, of which the following is a specification.

One object of my invention is to provide a means for holding a series of nuts in a chuck so that they can be slotted to form what is known in the trade as "castellated nuts."

A further object of the invention is to arrange the nuts so that one will hold another in proper position on a chuck plate.

A still further object of the invention is to provide a threaded pin, on which the nut is mounted, with means by which it can be turned either to attach or detach the nut from a plate.

These objects I attain in the following manner, reference being had to the accompanying drawing, in which:—

Figure 1, is a plan view of my improved means for securing nuts to a chuck plate; Fig. 2, is a sectional view on the line a—a, Fig. 1; Fig. 3, is an enlarged sectional view showing the nut secured to the pin; Fig. 4, is a perspective view of one of the holding pins; Fig. 5, is a perspective view of a key for turning the pins; Fig. 6, is a view illustrating a modification of the invention; Fig. 7, is a perspective view of the pin illustrated in the modification, Fig. 6; and Fig. 8, is a perspective view of a castellated nut.

After a nut has been cut and threaded, in many instances it has to be castellated or notched at the top so that a cotter pin can extend through a hole in the bolt and rest in one of the notches in the nut in order to lock the nut after it has been adjusted in the proper position.

My improved appliance is adapted to make the castellated nuts accurately and in large quantities.

The device is so arranged that the nuts can be readily assembled on a plate which is secured to a bed of a milling machine and the milling cutters will cut the grooves in a number of the nuts at the same time.

The invention can be applied to other machines for cutting or otherwise forming one end of a nut.

Referring to the drawings, 1 is a plate arranged to be secured to a bed of a milling machine, in the present instance, and in this plate is a circular opening for the reception of a disk 2 having a flange 3 which overlaps the plate, as illustrated in Fig. 2. This disk is detachably mounted on the plate and can be turned therein for a purpose described hereinafter. In the disk is a series of openings spaced a given distance apart and in these openings are pins 4 made as clearly illustrated in Fig. 4, having a threaded portion 5 at one end which projects above the disk, as in Fig. 3, and a head 6 which rests in a cavity in the underside of the disk. In the present instance headed screws 7 are screwed into the disk and overlap the heads of one or more pins, as clearly shown in Figs. 2 and 3. Other means for retaining the pins in place may be used without departing from the essential features of the invention.

In each pin is a square hole 8 in the present instance, which is adapted to receive a similarly shaped end 9 of a key 10, so that, when the key is inserted in the hole, the pin can be turned. While I have illustrated the pin having a square hole, the shape of the hole may be varied, as desired.

The openings in the disk are spaced a given distance apart according to the size of the nuts to be cut and, as illustrated in Fig. 1, when the nuts are assembled on the plate they are arranged close together so that one nut prevents the other from turning.

I preferably provide a clearance between the nuts so as to allow for any irregularities, but when the nuts are accurately threaded this clearance is unnecessary. The pins 4 project above the plate sufficiently to engage the lower portions of the nuts, as in Fig. 3, so as to leave a clearance for the cutting tool, which cuts a groove in the top of the nut. The depth of the groove may be varied, as desired.

The disk 2, in the present instance has twelve notches 11 therein and adapted to the notches are two bolts 12 pivoted at 13 to the plate 1 and arranged to be located in any of the notches. A nut 14 on the bolt locks the disk to the plate. In the periphery of the disk is a series of holes 15 into which a bar can be placed for turning the disk, if found desirable.

In the present instance the nuts are hexagonal and are so arranged on the plate that a cutter having nine cutting blades will cut a slot through each nut of the entire series when the disk is in one position. Then, by turning the disk a third of a revolution, the nuts will be in position so that the cutters will cut another slot in each nut of the series. Upon turning it another third revolution, the third slot will be cut in each nut. The slots will be accurately cut and each slot will pass through the center of a nut. At the present time, it is difficult to arrange a machine, unless great care is exerted, to cut the slots through the center of a nut.

In some instances, the plate 1 may form the permanent platen of a special machine, or the disk may form the platen and be turned by special mechanism, or the cutters may be turned and the disk may be stationary. The machine itself forms no part of my present invention.

In Figs. 6 and 7, I have illustrated a modification in which a pin 16, having a threaded portion extending above the disk, has a squared stem 17 projecting from its underside and instead of having a key, as illustrated in Fig. 5, a socket key may be used.

In some instances the hole 8 may extend only partly into the pin from the other end, but I prefer to extend it entirely through the pin so as to prevent the accumulation of dirt or chips.

It will be understood that I preferably provide disks for different sized nuts, and these disks can be readily inserted in the plate or platen when nuts of the given size are to be cut.

The chucks may be used for serrating the ribbed underside of the nuts instead of castellating them, and may be used for holding other articles than nuts where the pin can extend into a threaded opening, retaining the article in position on a plate or disk while it is being machined.

I claim:—

1. The combination of a plate; a pin mounted in the plate having a threaded portion extending beyond the surface of the plate and arranged to receive a nut, said pin having a hole to receive a key by which the pin is turned to draw the nut onto the plate.

2. The combination of a plate; a pin mounted in an opening in the plate and having a threaded portion projecting beyond the surface of the plate, said pin having a head at the opposite end; and means for preventing longitudinal movement of the pin in the plate, but allowing it to turn freely to engage the nut and to draw it to the plate.

3. The combination of a plate having a series of openings spaced therein a given distance apart; pins in the openings having threaded portions projecting beyond one surface of the plate, the pins being so spaced apart that the side of a nut mounted on one pin will be close to the side of a nut mounted on another pin so that one nut will prevent another from turning when the pins are turned to remove or detach a nut from the plate.

4. The combination of a plate, said plate having an opening therein; a disk mounted in the opening; means for locking the disk in different positions on the plate, said disk having a series of openings; pins mounted in the openings and having a threaded portion projecting above the surface of the disk; means for preventing longitudinal movement of the pins; and means whereby the pins are independently turned so that, when the nuts are mounted on the pins, they can be confined to the plate and the plate can be turned so that a cutter can cut a series of transverse slots in the nuts.

5. The combination of a plate having an opening therein; a disk mounted in the plate and having a flange; bolts pivoted to the plate and arranged to enter the notches in the disk, said disk having a series of openings spaced a given distance apart; pins in the openings, each having a head at one end and a threaded portion at the opposite end, said threaded portion projecting above the face of the disk; and means for retaining the pins against longitudinal movement in the disk, said pins being formed so that they can be turned independently by a key and, when the nuts are mounted on the pins, they can be drawn onto the disk and secured thereto and the disk can be turned so as to allow a cutting tool having a series of cutters to cut transverse grooves in each nut.

6. The combination in a chuck, of a plate; a threaded pin mounted therein; means for holding the pin against longitudinal movement, the threaded portion of the pin projecting above the surface of the plate, said pin having an opening throughout its length and arranged to receive a key by which it is turned to clamp a nut onto the plate.

In testimony whereof, I have signed my name to this specification, in the presence of two subscribing witnesses.

WILLIAM T. ✕ LINGO.
his mark

Witnesses:
RUFUS H. SANFORD,
JOHN A. ESTELL.